March 13, 1945.  W. G. L. SMITH  2,371,363
HOSE CONNECTOR
Filed Feb. 8, 1944
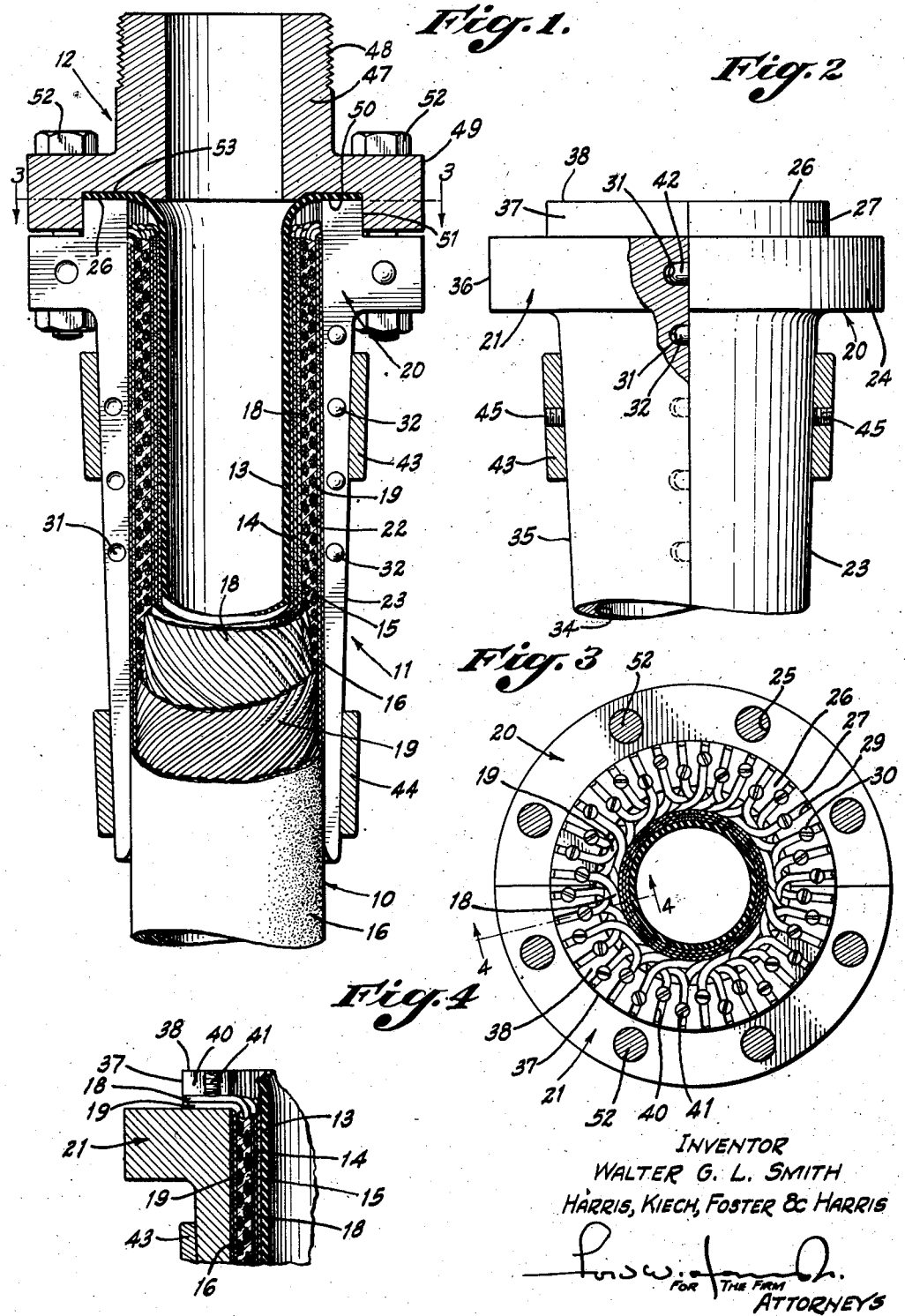
INVENTOR
WALTER G. L. SMITH
HARRIS, KIECH, FOSTER & HARRIS
ATTORNEYS Patented Mar. 13, 1945

2,371,363

UNITED STATES PATENT OFFICE 2,371,363

HOSE CONNECTOR

Walter G. L. Smith, Los Angeles, Calif.

Application February 8, 1944, Serial No. 521,515

10 Claims. (Cl. 285—72)

This invention relates to the hose coupling art, and more particularly to hose couplings for heavy duty hoses normally subjected to rough usage, and will be described in connection therewith, although it is to be understood that the invention may have other applications and should not be construed to be limited thereto.

Hose connectors for heavy duty hoses are well known in the art, an illustration thereof being disclosed in the patent to Graham, No. 2,277,397, granted March 24, 1942, to which reference is hereby made for the purpose of illustration. Such hose connectors are frequently adapted to connect a heavy duty hose to a suitable pipe coupling in installations where either the hose or the coupling is vigorously moved or agitated, and where the maximum wear on the hose normally occurs in it adjacent to or in the hose connector. Great difficulty has been experienced in providing a hose connector which will provide an adequate fluid seal between the coupling and the connector and still protect the hose, and, since such prior art devices have not been entirely successful under conditions of rough usage, it is a primary object of this invention to provide a substantial improvement on such prior art devices.

It is also an object of my invention to provide a hose connector of novel design in combination with a standard form of hose, which is adapted to provide the full strength of the hose at its juncture with the connector, the connector and hose being joined to a pipe coupling so as to form a fluid seal therebetween. Such standard hose has strands of wire or wire cable embedded in the body of the hose and extending longitudinally from end to end thereof, either straight or spiralled.

Other objects of my invention will appear from the specification and the drawing, which are for the purpose of illustration only and in which:

Fig. 1 is a longitudinal sectional view taken through the invention.

Fig. 2 is a fragmentary side elevational view of the hose connector of the invention, partly in section.

Fig. 3 is a cross-sectional view taken on the line 3—3 of Fig. 1.

Fig. 4 is a fragmentary sectional view taken on the line 4—4 of Fig. 3.

In the drawing, Fig. 1 shows a hose 10, connector means 11, and a coupling member 12. The hose 10 is preferably composed of a number of plies formed of different materials, as is well known in the art, and to illustrate such a hose I show an inner ply 13 formed of a flexible, fluid-tight material, such as, for example, rubber, a series of intermediate plies 14, which may be duck, canvas, or the like, an outer ply 15 formed as described hereinafter, and a covering ply 16, which likewise may be formed of duck, canvas, or the like. The outer ply 15 of the hose 10 includes a relatively large number of strands of wire disposed longitudinally of the hose, and in the form illustrated is comprised of an inner layer 18 of wires wound helically in one direction the length of the hose, and an outer layer 19 of such wires wound helically in the opposite directions longitudinally of the hose, both layers preferably being impregnated with rubber to hold the wires thereof together and to bond the layers together and to the adjacent plies. No novelty is claimed herein as to the particular form of hose construction employed, as such hoses are well known in the art, and it is to be understood that the connector means 11 may be used with a hose of the type illustrated or, in fact, any hose which includes an inner ply of a flexible, fluid-tight material and an outer ply of longitudinally disposed wires, whether the wires are helically disposed relative to the longitudinal axis of the hose or otherwise provided.

The connector means 11 includes a pair of generally symmetrical longitudinal halves forming semi-cylindrical members 20 and 21. The semi-cylindrical member 20 has a semi-cylindrical bore 22 and has an external tapered surface 23. The semi-cylindrical member 20 is provided adjacent one end with a projecting semi-circular flange 24 having bolt holes 25 therein, as best shown in Fig. 3. The semi-cylindrical member 20 is also provided with a semi-annular end face 26 formed on a boss 27. As best shown in Fig. 3, the boss 27 is provided with a plurality of radial openings in the form of slots 29, each of which is tapped to receive a set-screw 30. The semi-cylindrical member 20 is provided along one internal edge with guide holes 31 and and is provided along the other internal edge with projecting guide pins 32 diametrically disposed from the guide holes 31 and of generally similar configuration.

The semi-cylindrical member 21 is generally similar to the semi-cylindrical member 20, being provided with a bore 34, having an external tapered surface 35, a semi-circular flange 36, and a boss 37 provided with an end face 38. The boss 37 is likewise provided with radial slots 40 which are suitably tapped to receive set-screws 41. The semi-cylindrical member 21 is provided with guide pins 42, as best shown in Fig. 2, which are adapted to mate with the guide holes 31 of the semi-cylindrical member 20, and the semi-cylindrical member 21 is also provided with guide holes (not shown) similar to the guide holes 31, adapted to receive the guide pins 32, as will be understood by those skilled in the art. These guide holes and guide pins form a guide means of the invention, facilitating assembly of the semi-cylindrical members 20 and 21 and insuring accurate alignment of the members when in assembled position. As will be understood, the semi-cylindrical members 20 and 21 are assembled around the end of the hose 10, as shown in the drawing, making a close fit therewith, and then annular frusto-conical locking rings 43 and 44 are driven onto the tapered external surface of the connector means 11 to rigidly hold the semi-cylindrical members 20 and 21 together in assembled position, set-screws 45 being threaded through the locking rings to retain the rings longitudinally relative to the connector means.

As best shown in Figs. 3 and 4, the outer ends of the wires comprising the layers 18 and 19 of the outer ply 15 are passed into the slots 29 and 40 in the connector means 11, being held therein by the set-screws 30 and 41, respectively. The outer ply 15 is thus securely anchored to the connector means 11. Although in the embodiment shown I have illustrated one wire from the inner layer 18 and one wire from the outer layer 19 being passed into each of the radial slots, it will be understood that either more or less than two wires may be passed into each of the slots, or that either more or a lesser number of the slots may be provided, so long as the longitudinal pull of the hose is distributed circumferentially around the connector means 11, without departing from the spirit of my invention.

The coupling member 12 includes a central tubular body 47 having external threads 48 adapted to fit a pipe coupling or other suitable fluid connection (not shown). The tubular body 47 is provided with an annular flange 49 having an inner engaging face 50 and being provided with an annular lip 51 adapted to fit down over the bosses 27 and 37, the flange being suitably apertured to receive bolts 52 adapted to pass therethrough and through the bolt holes 25 of the connector means 11 to secure the coupling member 12 rigidly to the connector means 11.

In connecting the coupling member 12 with the connector means 11, the outer end 53 of the inner ply 13 is displaced laterally between the end faces 26 and 38 of the connector means 11 and the inner engaging face 50 of the coupling member and is tightly clamped therebetween by the bolts 52, thus providing a fluid-tight seal between the coupling member and the hose 10. Since the outer ply 15 of the hose 10 is designed to take substantially all of the longitudinal stresses between the connector means 11 and the hose 10, it will be apparent that substantially no longitudinal stress is placed on the inner ply 13 of the hose and that the same serves chiefly as a fluid-tight lining for the hose.

It is to be noted that by reason of the construction of my connector means 11 the hose 10 is uniform in cross section and construction throughout the connector means, thus availing of the normal hose strength at the important point of juncture between the hose and the connector means. This, normally, is the portion of the hose subjected to the greatest stresses and strains where the hose is subjected to whipping or rotating motion relative to the connector means, and by reason of my invention the hose may be quickly and easily secured to the connector means in a manner providing maximum strength in both, while retaining the fluid seal between the hose and the coupling member. This construction is a marked improvement over prior art devices in which a special end construction was required on the hose 10, or in which the plies of the hose were separated in connecting it to the connector means.

Although I have shown and described a preferred embodiment of my invention, it will be understood that changes in design may be made without departing from the spirit of my invention, and, accordingly, I do not desire to be limited to the specific embodiment illustrated, but desire to be afforded the full protection of the following claims:

I claim as my invention:

1. In a hose connector, the combination of: a hose, including an inner ply of flexible, fluid-tight material, and an outer ply having strands of wire disposed longitudinally of the hose, said plies being secured together; connector means including a sleeve member adapted to fit over said hose adjacent the end thereof and having an annular end face adjacent said end of said hose, and having a plurality of radial openings in said sleeve member adjacent said end face, each of said openings being adapted to receive one of said hose wires, said inner ply extending outwardly onto said end face; means for securing each of said wires in one of said openings; a coupling member having an annular surface adapted to clamp said inner ply against said end face in fluid-tight relation; and means for securing said coupling member to said connector means.

2. In a hose connector, the combination of: a hose, including an inner ply of flexible, fluid-tight material, and an outer ply having strands of wire disposed longitudinally of the hose, said plies being secured together; connector means including a sleeve member adapted to fit over said hose adjacent the end thereof and having an annular end face adjacent said end of said hose, and having a plurality of radial openings in said sleeve member adjacent said end face, each of said openings being adapted to receive one of said hose wires, said inner ply extending outwardly onto said end face, said sleeve member comprising a pair of symmetrical longitudinal halves adapted to form said sleeve member and having means for retaining said halves together in assembled relation; means for securing each of said wires in one of said openings; a coupling member having an annular surface adapted to clamp said inner ply against said end face in fluid-tight relation; and means for securing said coupling member to said connector means.

3. In a hose connector, the combination of: a hose, including an inner ply of flexible, fluid-tight material, and an outer ply having strands of wire disposed longitudinally of the hose, said plies being secured together; connector means including a sleeve member adapted to fit over said hose adjacent the end thereof and having an annular end face adjacent said end of said hose, and having a plurality of radial openings in said sleeve member adjacent said end face, each of said openings being adapted to receive one of said hose wires, said inner ply extending outwardly onto said end face, said sleeve member comprising a pair of symmetrical longitudinal halves adapted to form said sleeve member and having means for retaining said halves together in assembled relation, said halves having cooperating guide means thereon adapted to insure correct assembly alignment of said halves; means for securing each of said wires in one of said openings; a coupling member having an annular surface adapted to clamp said inner ply against said end face in fluid-tight relation; and means for securing said coupling member to said connector means.

4. In a hose connector, the combination of: a hose, including an inner ply of flexible, fluid-tight material, and an outer ply having strands of wire disposed longitudinally of the hose, said plies being secured together; connector means including a sleeve member adapted to fit over said hose adjacent the end thereof and having an annular end face adjacent said end of said hose, and having a plurality of radial slots in said end face, each of said slots being adapted to receive one of said hose wires, said inner ply extending outwardly onto said end face; means for securing each of said wires in one of said slots; a coupling member having an annular surface adapted to clamp said inner ply against said end face in fluid-tight relation; and means for securing said coupling member to said connector means.

5. In a hose connector, the combination of: a hose, including an inner ply of flexible, fluid-tight material, and an outer ply having strands of wire disposed longitudinally of the hose, said plies being secured together; connector means including a sleeve member adapted to fit over said hose adjacent the end thereof and having an annular end face adjacent said end of said hose, and having a plurality of radial openings in said sleeve member adjacent said end face, each of said openings being adapted to receive one of said hose wires, said inner ply extending outwardly onto said end face, said sleeve member comprising a pair of symmetrical longitudinal halves adapted to form said sleeve member, each of said halves having a tapered outer surface; ring means adapted to be slipped over said halves when assembled to engage said tapered outer surface to retain said halves rigidly together; means for securing each of said wires in one of said openings; a coupling member having an annular surface adapted to clamps said inner ply against said end face in fluid-tight relation; and means for securing said coupling member to said connector means.

6. In a connector device, the combination of: a first semi-cylindrical member having a first semi-circular end face on one end thereof, and having radial slots formed in said end face; a second semi-cylindrical member adapted to be assembled with said first member to form a cylindrical shell, said second member having a second semi-circular end face on one end thereof adapted to form a continuation of said first end face, and having radial slots formed in said second end face; and means for securing said members together in assembled relation.

7. In a connector device, the combination of: a first semi-cylindrical member having a first semi-circular end face on one end thereof, and having radial slots formed in said end face; a second semi-cylindrical member adapted to be assembled with said first member to form a cylindrical shell, said second member having a second semi-circular end face on one end thereof adapted to form a continuation of said first end face, and having radial slots formed in said second end face; means for cooperating with each of said slots to retain a wire therein; and means for securing said members together in assembled relation.

8. In a connector device, the combination of: a first semi-cylindrical member having a first semi-circular end face on one end thereof, and having radial slots formed in said end face, said first member having first guide means thereon; a second semi-cylindrical member adapted to be assembled with said first member to form a cylindrical shell, said second member having a second semi-circular end face on one end thereof adapted to form a continuation of said first end face, and having radial slots formed in said second end face, said second member having second guide means thereon adapted to cooperate with said first guide means to insure radial alignment of said members in assembled relation; and means for securing said members together in assembled relation.

9. In a hose connector adapted to be installed on a hose having a plurality of reinforcing wires therein, the combination of: connector means adapted to fit over a hose adjacent the end thereof, and having an annular end face adapted to be disposed adjacent the end of the hose, and having a plurality of radial openings, each of said openings being adapted to receive one of said wires; a coupling member having an annular surface adapted to clamp against said end face; and means for securing said coupling member to said connector means.

10. In a hose connector adapted to be installed on a hose having a plurality of reinforcing wires therein, the combination of: connector means adapted to fit over a hose adjacent the end thereof, and having an annular end face adapted to be disposed adjacent the end of the hose, and having a plurality of radial openings, each of said openings being adapted to receive one of said wires, said connector means having means for securing each of such wires in one of said openings; a coupling member having an annular surface adapted to clamp against said end face; and means for securing said coupling member to said connector means.

WALTER G. L. SMITH.